United States Patent
Kirby et al.

(10) Patent No.: US 7,917,540 B2
(45) Date of Patent: Mar. 29, 2011

(54) NONLINEAR SET TO SET PATTERN RECOGNITION

(75) Inventors: Michael Joseph Kirby, Fort Collins, CO (US); Christopher Scott Peterson, Fort Collins, CO (US)

(73) Assignee: Colorado State University Research Foundation, Fort Collins, CO (US)

( * ) Notice: Subject to any disclaimer, the term of this patent is extended or adjusted under 35 U.S.C. 154(b) by 361 days.

(21) Appl. No.: 12/036,117

(22) Filed: Feb. 22, 2008

(65) Prior Publication Data

US 2008/0256130 A1      Oct. 16, 2008

Related U.S. Application Data

(60) Provisional application No. 60/903,102, filed on Feb. 22, 2007.

(51) Int. Cl.
*G06F 7/00*   (2006.01)
*G06K 9/54*   (2006.01)

(52) U.S. Cl. .......................... 707/802; 382/170; 382/181

(58) Field of Classification Search .................. 707/758, 707/780, 999.107, E17.004, E17.019, E17.02, 707/802, 803; 706/2, 52, 20; 382/224, 305, 382/181, 170
See application file for complete search history.

(56) References Cited

U.S. PATENT DOCUMENTS

| | | |
|---|---|---|
| 4,752,957 A | 6/1988 | Maeda |
| 5,223,207 A | 6/1993 | Gross et al. |
| 5,586,066 A | 12/1996 | White et al. |
| 5,629,872 A | 5/1997 | Gross et al. |
| 5,745,382 A | 4/1998 | Vilim et al. |
| 5,761,090 A | 6/1998 | Gross et al. |
| 5,764,509 A | 6/1998 | Gross et al. |
| 5,842,194 A * | 11/1998 | Arbuckle .................... 706/52 |
| 6,119,111 A | 9/2000 | Gross et al. |
| 6,131,076 A | 10/2000 | Stephan et al. |
| 6,466,685 B1 | 10/2002 | Fukui et al. |
| 6,493,465 B2 | 12/2002 | Mori et al. |
| 6,996,257 B2 | 2/2006 | Wang |
| 7,224,835 B2 | 5/2007 | Maeda et al. |
| 2005/0147291 A1 | 7/2005 | Huang et al. |

OTHER PUBLICATIONS

Vasconcelos, N. and Lippman, A., "A multiresolution manifold distance for invariant image similarity," IEEE Transactions on Multimedia, 2005, 17 pages, University of California, posted at eScholarship Repository, <http://repositories.cdlib.org/postprints/692.

(Continued)

*Primary Examiner* — Hung T Vy
(74) *Attorney, Agent, or Firm* — Hensley Kim & Holzer, LLC

(57) ABSTRACT

Variations in the states of patterns can be exploited for their discriminatory information and should not be discarded as noise. A pattern recognition system compares a data set of unlabeled patterns having variations of state in a set-by-set comparison with labeled arrays of individual data sets of multiple patterns also having variations of state. The individual data sets are each mapped to a point on a parameter space, and the points of each labeled array define a subset of the parameter space. If the point associated with the data set of unlabeled patterns satisfies a similarity criterion on the parameter space subset of a labeled array, the data set of unlabeled patterns is assigned to the class attributed to that labeled array.

20 Claims, 6 Drawing Sheets

OTHER PUBLICATIONS

Arandjelovic, O. and Cipolla, R., "An information-theoretic approach to face recognition from face motion manifolds," University of Cambridge, accepted Aug. 23, 2005, 9 pages, Copyright 2005, Elsevier B.V.

Gross, R., Matthews, I., and Baker, S., "Appearance-Based Face Recognition and Light-Fields," IEEE Transactions on Pattern Analysis and Machine Intelligence, vol. 26, No. 4, Apr. 2004, published by IEEE Computer Society.

Fraser, A., Hengartner, N., Vixie, K. and Wohlberg, B., "Classification Modulo Invariance, with Application to Face Recognition," 19 pages, Los Alamos National Laboratory.

Gross, R., Matthews, I., and Baker, S., "Eigen Light-Fields and Face Recognition Across Pose," The Robotics Institute, Carnegie Mellon University, Pittsburgh, PA, 7 pages, appeared in 2002 International Conference on Automatic Face and Gesture Recognition.

Romdhani, Sr., Blanz, V., and Vetter, T., "Face Identification by Fitting a 3D Morphable Model using Linear Shape and Texture Error Functions," University of Freiburg, Freiburg, Germany, appeared in European Conference on Computer Vision, 2002, Springer-Verlag, Germany.

Quan-Sen Sun, Pheng-Ann Heng, Zhong Jin, and De-Shen Xia, "Face Recognition Based on Generalized Canonical Correlation Analysis," International Conference on Intelligent Computing 2005, Part II, Lecture Notes in Computer Sciences 3645, pp. 958-967, Copyright 2005 Springer-Verlag, Germany.

Shakhnarovich, G., Fisher, J.W., and Darrell, T., "Face recognition from long-term observations," Artificial Intelligence Laboratory, Massachusetts Institute of Technology, white paper, 15 pages.

Arandjelovic, O., and Cipolla, R., "Face Recognition from Video using the Generic Shape-Illumination Manifold," Department of Engineering, University of Cambridge, Cambridge, UK, white paper, 15 pages.

Fukui, K., and Yamaguchi, O., "Face Recognition Using Multi-viewpoint Patterns for Robot Vision," Corporate Research and Development Center, Toshiba Corporation, Kawasaki, Japan, presented at 11th International Symposium of Robotics Research (ISRR) 2003, pp. 192-201.

Yamaguchi, O., Fukui, K., and Maeda, K., "Face Recognition Using Temporal Image Sequence," Kansai Research Laboratories, Toshiba Corporation, Kobe, Japan, white paper, 6 pages.

Arandjelovic, O., Shakhnarovich, G., Fisher, J., Cipolla, R., and Darrell, T., "Face Recognition with Image Sets Using Manifold Density Divergence," presented at Proceedings of the 2005 IEEE Computer Society Conference on Computer Vision and Pattern Recognition, Copyright 2005, Institute of Electrical and Electronics Engineers, Inc., 8 pages.

Nishiyama, M., Yamaguchi, O., and Fukui, K., "Face Recognition with the Multiple Constrained Mutual Subspace Method," Audio- and Video-Based Biometric Person Authentication (AVBPA), 5th International Conference, Lecture Notes in Computer Science 3546, pp. 71-80, AVBPA 2005, Rye Brook, New York.

Gross, R., Matthews, I., and Baker, S., "Fisher Light-Fields for Face Recognition Across Pose and Illumination," The Robotics Institute, Carnegie Mellon University, Pittsburgh, PA, 8 pages.

Georghiades, A.S., Belhumeur, P.N., and Kriegman, D.J., "From Few to Many: Generative Models for Recognition Under Variable Pose and Illumination," Departments of Electrical Engineering and Computer Science, Yale University, New Haven, Connecticut, and Beckman Institute, University of Illinois Urbana Illinois, 8 pages.

Edelman, A., Arias, T.A., and Smith, S.T., "The Geometric of Algorithms With Orthogonality Constraints," SIAM J. Matrix Anal. Appl., vol. 20, No. 2, pp. 303-353, Copyright 1998 Society for Industrial and Applied Mathematics.

Chang, Jen-Mei, Beveridge, J.R., Draper, B.A., Kirby, M., Kley, H., and Peterson, C., "Illumination Face Spaces are Idiosyncratic," white paper, Colorado State University, Departments of Computer Science and Mathematics, Ft. Collins, Colorado, 7 pages.

Zhou, S.K. and Chellappa, R., "Image-based face recognition under illumination and pose variations," Journal of the Optical Society of America A, vol. 22, No. 2, Feb. 2005, pp. 217-229, Copyright 2005 Optical Society of America.

Fitzgibbon, A.W. and Zisserman, A., "Joint Manifold Distance: a new approach to appearance based clustering," white paper, University of Oxford, UK, Copyright 2003 Institute of Electrical and Electronics Engineers, Inc., 8 pages.

Basri, R., and Jacobs, D.W., "Lambertian Reflectance and Linear Subspaces,"IEEE Transactions on Pattern Analysis and Machine Intelligence, vol. 25, No. 2, Feb. 2003, pp. 218-233, published by IEEE Computer Society.

Tae-Kyun Kim, Kittler, Jr., and Cipolla, R., "Learning Discriminative Canonical Correlations for Object Recognition with Image Sets," white paper, pp. 1-12, Dept. of Engineering, University of Cambridge, Cambridge, UK, Centre for Vision, Speech and Signal Processing, University of Surry, Guildford, UK.

Tae-Kyun Kim, Arandjelovic, O., and Cipolla, R., "Learing over Sets using Boosted Manifold Principal Angles (BoMPA)," Department of Engineering, University of Cambridge, Cambridge, UK, white paper, 10 pages.

Wolf, L. and Shashua, A., "Learning over Sets using Kernel Principal Angles," Journal of Machine Learning Research 4, published Oct. 2003, pp. 913-931, Copyright Lior Wolf and Amnon Shashua.

Jen-Mei Change, Kirby, M., Kley, H., Peterson, C., Draper, B., and Beveridge, J.R., "Recogition of Digital Images of the Human Face at Ultra Low Resolution via Illumination Spaces," white paper, Dept. of Mathematics, Colorado State University, Ft. Collins, Colorado, 11 pages.

Vasconcelos, N. and Lippman, A., "Multiresolution Tangent Distance for Affine-invarianct Classification," white paper, 7 pages, MIT Media Laboratory, Cambridge, Massachusetts.

Liu, Xiuwen, Srivastava, A., and Gallivan, K., "Optimal Linear Representations of Images for Object Recognition," presented at the Proceedings of the 2003 IEEE Computer Society Conference on Computer Vision and Pattern Recognition (CVPR), 6 pages, Copyright 2003, Institute of Electrical and Electronics Engineers, Inc.

Conway, J.H., Hardin, R.H., and Sloane, N.J.A., "Packing Lines, Planes, etc.: Packings in Grassmannian Spaces," Experimental Mathematics, vol. 5, No. 2, 1996, pp. 139-159, Copyright A.K. Peters, Ltd., Wellesley, Massachusetts.

Dahua Lin, Shuicheng Yang, and Xiaoou Tang, "Pursuing Informative Projection on Grassman Manifold," presented at the Proceedings of the 2006 IEEE Computer Society Conference on Computer Vision and Pattern Recognition (CVPR), 8 pages, Copyright 2006, Institute of Electrical and Electronics Engineers, Inc.

Nishiyama, M., Yuasa, M., Shibata, T., Wakasugi, T., Kawahara, T., and Yamaguchi, O., "Recognizing Faces of Moving People by Hierarchical Image-Set Matching," Corporate Research & Development, Toshiba Corporation, Japan, 8 pages, Copyright 2007, Institute of Electrical and Electronics Engineers, Inc.

Chang, Jen-Mei, Kirby, M., and Peterson, C., "Set-to-Set Face Recognition Under Variations in Pose And Illumination," presented at the 2007 Biometrics Symposium, Baltimore, MD, Sep. 2007, Copyright 2007, Institute of Electrical and Electronics Engineers, Inc.

Simard, P.Y., LeCun, Y.A., Denker, J.S., and Victorri, B., "Transformation Invariance in Pattern Recognition—Tangent Distance and Tangent Propagation," Image Processing Services Research Lab, AT&T Labs, Red Bank, New Jersey and University of Caen, France, white paper, 35 pages.

Belhumeur, P.N., Kriegman, D.J., "What is the Set of Images of an Object under All Possible Illumination Conditions?" International Journal of Computer Vision, vol. 28, Issue No. 3, pp. 1-16, Copyright 1998 Kluwer Academic Publishers, Boston, Massachusetts.

* cited by examiner

NONLINEAR SET TO SET PATTERN RECOGNITION

CROSS-REFERENCE TO RELATED APPLICATIONS

The present application claims benefit of U.S. Provisional Application No. 60/903,102, entitled "Multivariate State Estimation Technique for Pattern Recognition and Multi-class Image Classification" and filed on Feb. 22, 2007, which is specifically incorporated by reference herein for all that it discloses and teaches.

The present application is also related to co-pending U.S. patent application Ser. No. 11/846,486, entitled "Set to Set Pattern Recognition" and filed on Aug. 28, 2007.

STATEMENT REGARDING FEDERALLY SPONSORED RESEARCH OR DEVELOPMENT

This technology was developed with sponsorship by the National Science Foundation Contract No. DMS-0434351, and the Air Force Office of Scientific Research Contract No. FA9550-04-1-0094 P00002, and the government has certain rights to this technology.

BACKGROUND

Face recognition technology is a type of pattern recognition used to identify an individual based on video or still frame images of the individual's face. Typically, a data set of images of the individual's face (i.e., a specific type of pattern) is first collected and then a face image of an unknown individual is evaluated relative to this data set. Traditional face recognition has focused on individual comparisons between single images. As such, if the unknown face image sufficiently matches one or more of the data sets of the known individual, the unknown face image may be classified as that of the individual.

Typically, however, the initial data set of images tends to include substantial variations of state (e.g., in illumination and pose) that make the evaluation with the unknown face image difficult to resolve. In one existing approach, illumination and/or pose variations, for example, in the data set of images are removed by computing illumination and/or invariant images to obtain a more normalized data set. Likewise, an illumination and/or pose invariant versions of the unknown image may also be computed. Unfortunately, such normalization discards or obfuscates unique characteristics of each image.

SUMMARY

Implementations described and claimed herein address the foregoing problems, among others, by recognizing that variations in the states of patterns can be exploited for their discriminatory information and should not be discarded as noise. A pattern recognition system compares a data set of unlabeled patterns having variations of state in a set-by-set comparison with labeled arrays of individual data sets of multiple patterns also having variations of state. The individual data sets are each mapped to a point on a parameter space, and the points of each labeled array define a subset of the parameter space. If the point associated with the data set of unlabeled patterns satisfies a similarity criterion on the parameter space subset of a labeled array, the data set of unlabeled patterns is assigned to the class attributed to that labeled array.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. It should also be understood that, although specific implementations are described herein, the described technology may be applied to other systems.

BRIEF DESCRIPTIONS OF THE DRAWINGS

DETAILED DESCRIPTIONS

The described technology takes advantage of variations in multiple states of a pattern drawn from a family of patterns. These variations can be exploited to improve association of unidentified sets of patterns to labeled sets of patterns (e.g., classification). As such, collected data with variations of state (e.g., variations in illumination and pose of an image subject) can be employed to improve pattern recognition accuracy.

Generally, set-to-set pattern recognition is performed in at least one implementation by encoding (e.g., mapping) a data set of patterns abstractly as a point on a parameter space. The term "point" is general and results from the mapping of a data set (e.g., images or other patterns) as a point on a Grassmann manifold, a Stiefel manifold, a flag manifold, or other parameter space. In one implementation, a data set of patterns is processed to define a subspace represented as a point on a Grassmannian. In another implementation, the data set of patterns is processed to define an ordered set of orthonormal vectors as a point on a Stiefel manifold. Other mappings are also contemplated, such as to a point on a flag manifold or a product of manifolds. By these example applications, each data set of patterns is mapped to a point on the parameter space.

It is helpful to describe this technology in relation to a specific application, such as image recognition, although it should be understood that many other applications may benefit from this technology. Other applications may include detecting patterns of control and sensor signals in a manufacturing facility, a power plant, a communications system, a vehicle, etc. and monitoring patterns in radar signals or remote sensor signals.

Figure 1:
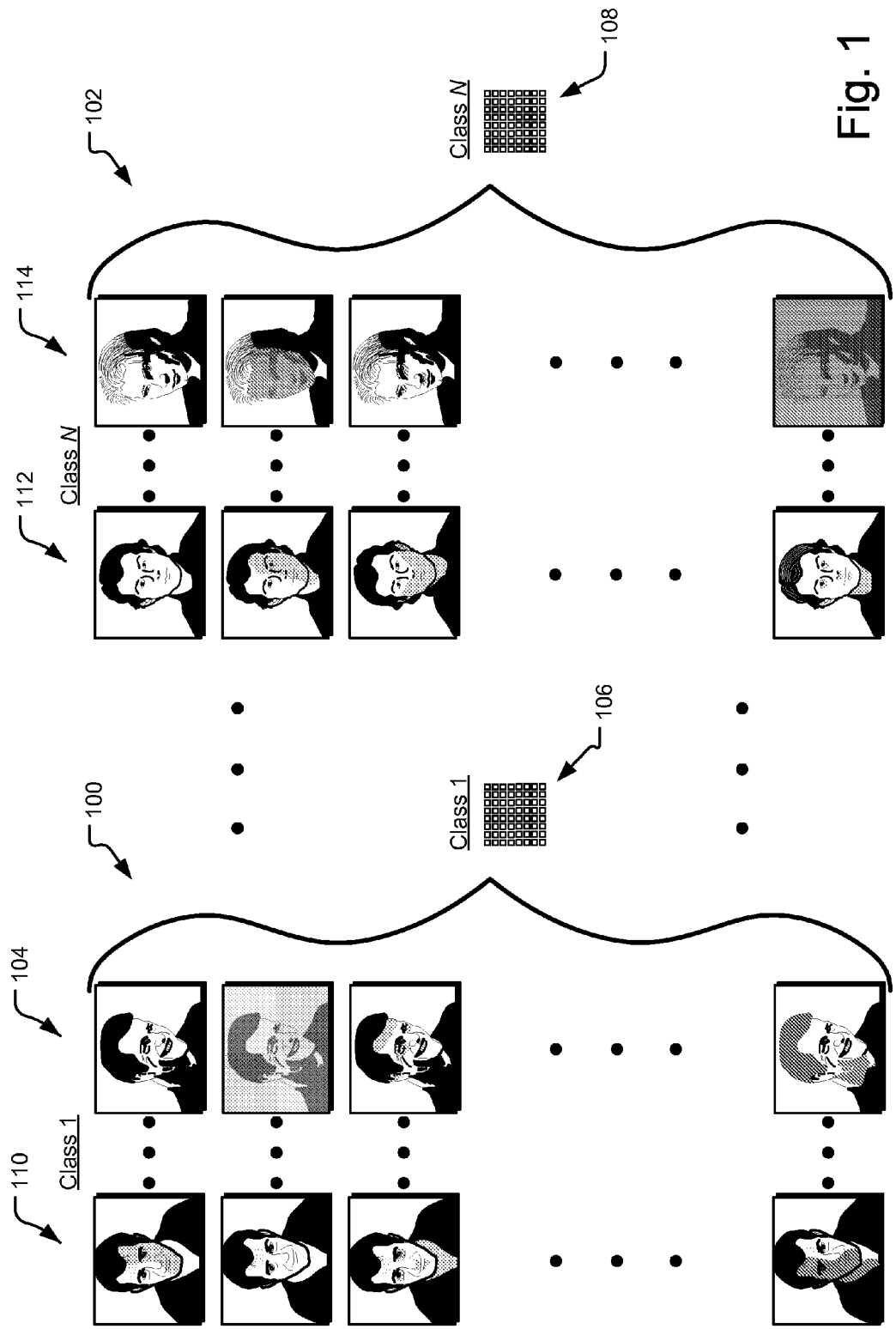
FIG. 1 illustrates example images allocated into data sets of labeled arrays.

FIG. 1 illustrates example images allocated into data sets of labeled arrays 100 and 102. The labeled arrays 100 and 102 represent training data that can be used by a classifier to classify a data set of unlabeled images. Each labeled array 100 and 102 represents data designated as a member of a particular class of a set of N classes (e.g., the array 100 is labeled as Class 1 and the array 102 is labeled as Class N). The dots between the labeled arrays 100 and 102 indicate that additional labeled arrays may also exist in the training data. To facilitate the description, FIG. 1 shows that the individual arrays may be represented by the labeled array icons 106 and 108.

Each column in a labeled array represents a data set of images (e.g., data set 104) with variations in state (e.g., illumination) within each data set. The dots between the data sets of a labeled array indicate that additional data sets may also exist in the labeled array. An individual image is termed an element of a data set, and the dots within each data set indicated that additional elements may also exist within a data set. In the illustrated example, the pose of the subject (e.g., the subject is facing the camera head-on in the left-most column of Class 1 and is nearly showing a right profile in the right-most column of Class 1) varies among data sets.

Using the image recognition context as an example, each data set of patterns (e.g., images) is allocated into a labeled array of data sets (e.g., images of a single person), such that there are multiple (1 to N) labeled arrays of data sets, each labeled array being designated to a class (class 1 to class N). In this manner, data sets of each class are collected into their own labeled array. For example, a collection of images of a first individual are allocated to an array labeled with the individual's name "John Smith" (i.e., a first class). Within each array, the images of John Smith are allocated into different data sets, each data set pertaining to a different pose (e.g., head-on, right profile, left profile, etc.). Within each data set, the images of John Smith may have variations in illumination from one to another but share the same pose.

It should also be understood that variations of state need not be partitioned relative to individual data sets in any particular fashion, although in the example of FIG. 1, different data sets have been described as containing images of distinct poses. Further, it should be understood that the data in the individual elements of each data set may represent any kind of pattern—images are merely example data set elements.

Figure 2:
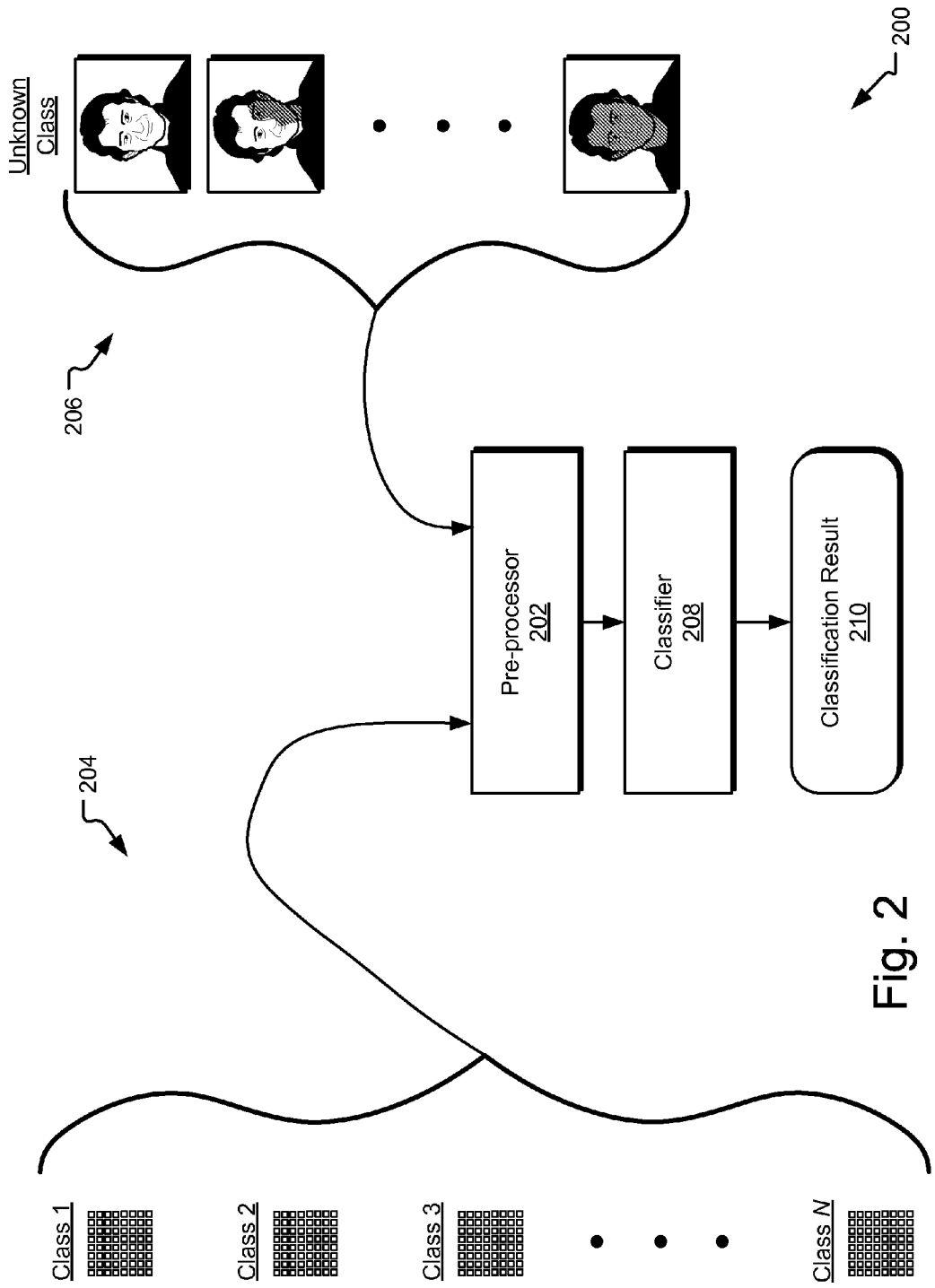
FIG. 2 illustrates an example system for performing set-to-set pattern recognition.

FIG. 2 illustrates an example system 200 for performing set-to-set pattern recognition. A pre-processor 202 receives a collection 204 of labeled arrays of multiple labeled images. Each array, and therefore each data set and each image, is labeled with a class designation 1 through N (e.g., a class designation may indicate the subject's identity). Each data set within a labeled array represents multiple observations of a member of the class, possibly in multiple modalities (e.g., audio and video data). Accordingly, FIG. 2 shows a collection 204 of data set arrays, where each labeled array is represented as $X_i$ for i=1, ... N. Each array is labeled as originates from one of N-classes (e.g., individual identities) or families of patterns, represented as $\omega_1, \omega_2, \omega_3, \ldots \omega_N$.

Each observation in a data set and each labeled array has a shared characteristic, such as being associated with the same individual, the same object, etc. In one implementation, for example, each data set includes multiple images having a variation of state distinguishing each image in the data set from each other image in the data set. For example, in the data set 104 of FIG. 1, each image depicts the same individual under variations of state (e.g., illumination variations) and a first pose (e.g., head-on view). Likewise, the data set 110 includes images of the same individual under different variations of state (e.g., illumination variations) and a second pose (e.g., head turned to subject's left). In contrast, in the data set 112 of FIG. 1, each image depicts a different individual than the man depicted in data sets 104 and 110. Nevertheless, the images in data set 112 depict the same individual within data set 112 under variations of state (e.g., illumination variations) and a first pose (e.g., head-on view). Likewise, the data set 114 includes images of the same individual as data set 112 under different variations of state (e.g., illumination variations) and a second pose (e.g., head turned to subject's right). Variations of multiple states simultaneously, such as pose and illumination varying together, provides significant additional information that can be employed in a fashion similar to the variation of a single state for enhanced classification.

In an alternative implementation, the shared characteristic is not limited to an "identity" of the subject but instead can be a shared characteristic among multiple distinct objects. For example, the observations may be images of different tissue samples having the same pathology (e.g., all of the tissue samples in a data set have a particular type of cancerous cells), all of the military tank images in a data set are of the same model type, all of the satellite photos of a geographical region are cultivated, etc. As such, each data set may include observations representing families of patterns, where all patterns in a family share at least one characteristic.

Other variations of state may include without limitation physical conditions (e.g., temperature, pressure), positional conditions (e.g., distance, scale, translation, rotation), illumination (e.g., angle, intensity, frequency, wavelengths distributions) and other characteristics. It should also be understood that other variations of state may apply, particularly for patterns other than images (e.g., electroencephalography or "EEG" results, electrocardiogram or "EKG" results, audio signatures, etc.). A combination of values representing one or more select conditions of each observation (e.g., each image) defines the variation of state of that observation.

In addition, the pre-processor 202 also receives a data set 206 of multiple related but unlabeled images. The data set 206 represents multiple observations of a member of an unknown class. In one implementation, for example, each data set includes multiple images having variations of state distinguishing each image in the data set from each other image in the data set.

The pre-processor 202 estimates a point representing a given data set of patterns. An example mechanism for estimating a point (or any applicable point informed by variations in state) for a given individual person is described herein. However, it should be understood that such a mechanism or other similar mechanisms may be applied to other patterns (e.g., EEG results, EKG results, sonar signals, radar signals, microscopic patterns, satellite images, infrared images, ultra-violet images, etc.). In the case of faces, for example, each face image may be geometrically normalized based upon known eye positions. In addition, the background area outside the face itself (or some other predetermined sub-region) may be zeroed, erased, or ignored. However, a benefit of the described technology is that such normalization may be omitted or reduced in such as way as to take advantage of these variations.

In one implementation, a point on a parameter space is encoded by first mapping the set of images to a set of ordered orthonormal basis vectors (Stiefel manifold) or a subspace of a fixed vector space (Grassmann manifold). In another implementation, a point may be viewed as the concatenation of points arising from nested parameterizations of different dimensions. The set of orthonormal vectors may be found via a range of encoding algorithms including but not limited to the singular value decomposition (SVD), the generalized singular value decomposition, signal fraction analysis, principal vectors, independent component analysis and canonical correlation analysis.

As a generalization of such approaches, a set of data may be encoded to a point as a nested sequence of subspaces of fixed dimensions on a flag manifold. The encoding of a point on a parameter space may use the data in its original acquisition space or in an altered form. In one implementation, whether a point is encoded on a Grassmann, Stiefel, or flag manifold, or even a more general parameter space, is dependent upon the nature of the information comprising the data set. The Grassmann representation is coarser than the Stiefel representation because two points are identified if they are related by a rotational matrix (i.e., there is a subjective map from the Stiefel manifold to the Grassmann manifold by identifying an ordered k-tuple of orthonormal vectors to their span). The flag manifold point representation reveals information about the pattern set across a hierarchy of nested subspaces. Additionally, points on the flag manifold can have additional information attached to them by extending the flag manifold as a product manifold, which captures desirable weightings of the subspaces.

For example, each image may be unrolled into a vector $x_i^{(j)}$, which is the $j^{th}$ data set of observations or images of the subject i. Each data matrix $X_i$ for data set of subject i (e.g., corresponding to an individual labeled array of patterns) is then denoted by $X_i=[X_i^{(1)}| \ldots |X_i^{(k)}]$, where there are k data sets of images of the subject i. This raw data matrix can, without data compression, be used to generate an ordered orthonormal basis, or sequence of nested bases, to encode the data set to a point or set of points on a nonlinear parameter space.

In some implementations, the data matrix may be initially reduced to yield the desired encoding representation on a nonlinear parameter space. For example, a subspace representation for the $i^{th}$ subject may be constructed from the k images of its data matrix $X_i$ via SVD. The q basis vectors for the $i^{th}$ subject's q-dimensional subspace are the strongest q-left singular vectors in the SVD of $X_i$. In other words, the q-dimensional subspace of $X_i$ is given by the column space $R(X_i)$ of its first q left singular vectors.

An orthogonal projection that is the transpose of the matrix of the left singular vectors obtained via SVD of $X_i$ is applied to $X_i$ to serve as a first-step dimensionality reduction. This computation allows selection of a parameter space upon which the data is encoded.

In some applications, one or more datasets may be augmented by including mirror images or additional images altered by some other transformation. For facial images, the symmetrization of the data set imposes even and odd symmetry on the basis functions analogous to sinusoidal expansions. For sets of facial images under varying illumination conditions, reflection augmentation may improve the estimated linear representation by both increasing the effective sample set and introducing novel illumination conditions. As a consequence, the estimation of points that capture variations in illumination for each class can be improved without acquiring additional data.

In addition to computing points on parameter spaces that capture the variation in illumination, the pre-processor 202 can also constrain the computation of points by restricting the raw data to one or more "patches" of the observation, to projections to fiducial points within the image, or even to an arbitrary selection of image points (e.g., random projections) within each image. In such implementations, the patches or data points used are consistent from observation to observation and data set to data set. (A patch may be considered a strictly or loosely connected set of points within the base image or pattern.)

A set of observations may also contain multiple modalities and within each modality a disparate number of points. For example, a set may consist of images each of which has a different number of pixels. The pre-processor 202 may normalize these images by interpolating values to make render each image the size of the highest resolution image.

Grassmann manifolds, as well as Stiefel manifolds and flag manifolds, allow for families of matrices that fit into the described framework, although other parameter spaces may be employed. A distinction between the Grassmann manifold and the Stiefel manifold is that the Grassmann manifold Gr(k, n) views every k-dimensional subspace of $R^n$ (respectively $C^n$) as a point while a Stiefel manifold S(k,n) views every ordered k-tuple of orthonormal vectors in $R^n$ (respectively $C^n$) as a point. The Stiefel manifolds are not rotationally invariant and afford discriminatory information when there is information in a subspace that is related to the ordering of the basis vectors. For example, different frequencies of illumination generate different bases. As such, if one does not want the subspace representation to be rotationally invariant, mapping the data sets to a Stiefel manifold may be preferred. In this choice, different orderings of the basis correspond to fundamentally different objects. In alternative implementations, flag manifolds are generalizations of a hierarchical subspace representation that creates a more refined structure for pattern recognition. Products of manifolds allow for even further refinement of the information that can be captured in a parameter space.

In summary, the pre-processor 202 estimates a point on a parameter space representing each data set of each class of facial images. This concept extends to other patterns and variations of state as well—for each pattern in a given family, a pre-processor estimates a point (e.g., a subspace, a sequence of nested subspaces or an ordered orthonormal basis, all representing a data set of patterns) in a geometric parameter space. Furthermore, it should be understood that the data from which each point is estimated may be constrained consistently across the patterns and data sets. For example, the estimation may be performed using only a region of each facial image corresponding to the right eye in each image. Alternatively, a pattern of arbitrarily-selected pixels may be extracted consistently from each image and the point estimate may be developed from the values of those arbitrarily-selected pixels. In this fashion, a point representing the $X_i^{(\cdot)}$ of each data set is generated.

A classifier 208 receives the computed points representing variations in illumination for both the data sets in the collection 204 and the data set 206. The classified 208 applies the similarity criterion to yield the classification result 210 that identifies the class in which the data set 206 belongs or otherwise indicates that no classification was achieved.

Figure 3:
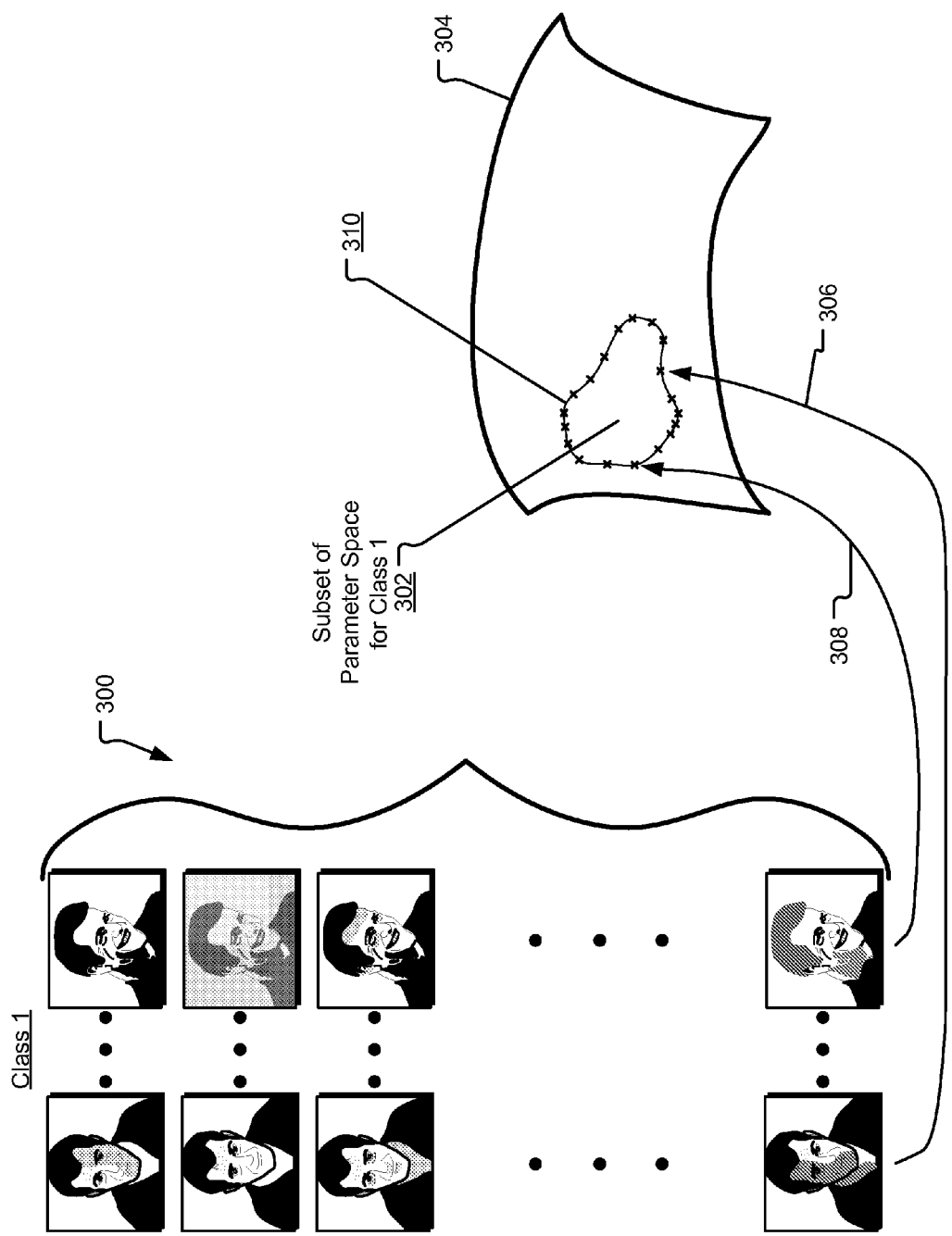
FIG. 3 illustrates an example relationship defined between a labeled array of data sets and an associated subset of a parameter space.

FIG. 3 illustrates an example relationship defined between a labeled array 300 of data sets and an associated subset (as indicated by region 302) of a parameter space 304. A mapping operator is generated from the training data of a labeled array such that each data set of the labeled array 300 can be mapped to a point on the parameter space 304. For example, the left-most data set of labeled array 300 is mapped to a point on the parameter space 304, as indicated by arrow 306, and the right-most data set of labeled array 300 is mapped to a point on the parameter space 304, as indicated by arrow 308. Each point mapped from the data sets of the labeled array 300 onto the parameter space 304 is designated by an "x". In aggregate, the mapped points would form a region (represented by line 310) on the parameter space 304, which defines the subset 302 of the parameter space associated uniquely with the labeled array 300 and the Class 1.

Figure 4:
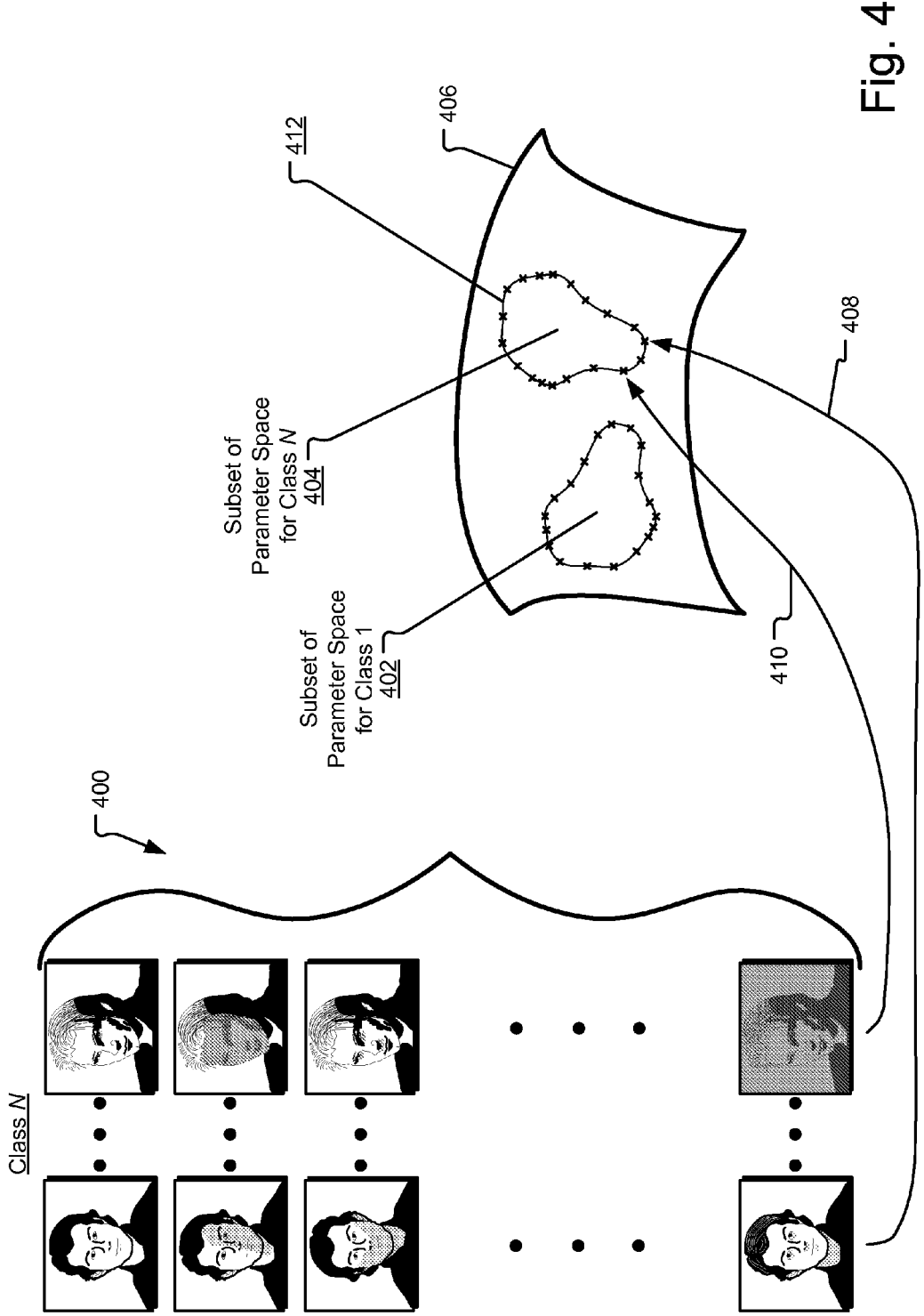
FIG. 4 illustrates an example relationship defined between another labeled array of data sets and an associated subset of a parameter space, relative to a different subset of the parameter space associated with a different array of data sets.

FIG. 4 illustrates an example relationship defined between another labeled array 400 of data sets and an associated subset (as indicated by region 402) of a parameter space, relative to a different subset 404 of the parameter space associated with a different array of data sets (not shown). A mapping operator is generated from the training data of a labeled array such that each data set of the labeled array 400 can be mapped to a point on the parameter space 406. For example, the left-most data set of labeled array 400 is mapped to a point on the parameter space 406, as indicated by arrow 408, and the right-most data set of labeled array 400 is mapped to a point on the parameter space 406, as indicated by arrow 410. Each point mapped from the data sets of the labeled array 400 and of the different array of data sets (not shown) onto the parameter space 406 is designated by an "x".

In aggregate, the mapped points of the labeled array 400 form a region on the parameter space 406, which defines a subset 404 of the parameter space associated uniquely with the labeled array 400 and the Class N. The subsets defined for each labeled array by the mapping(s) of data sets to points on the parameter space 406 do not tend to overlap in the parameter space 406, although overlapping may occur in some circumstances. As such, a data set of unlabeled elements can be mapped to the parameter space 406 using the mapping operator of each class and can then be similarity tested to determine if it lies on or substantially on one of the class subsets of the parameter space 406.

In one implementation, similarity measurements (e.g., $d(\bullet)$) are executed on the data set of unlabeled elements using each of the mapping operators i, where i=1, . . . , N. The minimum similarity measurement indicates the subset on the parameter space 406 on which the point is best located—a similarity criterion. (In addition, as part of a similarity criterion, a similarity threshold may also be applied to a minimum similarity measurement that is not small enough to warrant classification in the class associated with the mapping operator.) As such, the classifier designates the data set of unlabeled elements as being a member of a class if (a) the similarity measurement associated with that class is the minimum across all classes; and (b) the similarity measurement satisfies a designated threshold. Condition (a) picks the class having the best fit for the data set of unlabeled elements. Condition (b) indicates that no pattern match results if the similarity measurement is too large (e.g., if the training data of the labeled arrays does not include images of the individual in the unknown set). If no pattern match results, then the classifier may indicate that a new class has been detected.

Mathematical support for the described approach is provided in the context of classifying video sequences based on a set of N classes $\omega_1, \omega_2, \omega_3 \ldots \omega_N$. The derivation below is given in terms of Grassmann Manifolds, but the approach may be applied to other parameters spaces, as previously discussed. Accordingly, training data in the form of data sets in labeled arrays is collected such that the data sets of each labeled array map to points on a Grassmannian (i.e., on Gr(k, n). For example, the training data for class $\omega_i$ maps to points $$D_i = \{X_i^{(1)}, \ldots, X_i^{(P_i)}\}$$

which is a set of points on Gr(k,n), or in terms of raw data, a set of data sets of data points. The notation Pi represents the number of images in each data set. In this manner, the data sets associated with a particular class can be viewed as a cloud of points on the Grassmannian (see, e.g., regions 402 and 404 of FIG. 4). The domain values X as well as the range values M(X) reside on the Grassmannian Gr(k,n).

For each class i, a mapping operator may be defined as $M^{(i)}$: Gr(k,n)→Gr(k,n), such that the mapping operator $M^{(i)}$ takes the form $$M(X) = D \cdot (D^T * D)^{-1} D^T * (X)$$

where the * operator represents a nonlinear similarity measure. An example nonlinear * operator is constructed as a function of the principal angles between the data in D and the point $X \in Gr(k,n)$, such as $$a * b = 1 - \left(\frac{2}{\pi}\right)\theta_r(a, b)$$

where $\theta_r(a,b)$ is the $r^{th}$ principal angle between the vector spaces $V_a, V_b$ associated to the points $a,b \in Gr(k,n)$. Another example nonlinear * operator may be given by $$a * b = \sqrt{\sum_i \theta_i^2}$$

although other operators may also be employed.

For each $\omega_i$ and every collected labeled array $X \in \omega_i$, a mapping $M^{(i)}$ is constructed such that the similarity criterion of Equation 1 is satisfied, $$d(X, M^{(i)}(X)) < \epsilon_M \quad (1)$$

where $d(\bullet)$ represents a similarity measurement defined on the appropriate parameter space. The requirements on the magnitude of the intrinsic modeling error value $\epsilon_M$ are flexible and may be taken to be based on factors such as the machine precision, reasonable lnposelstarterrorlnposelends expected in nonlinear optimization problems (e.g., $\epsilon_M = O(10^{-4})$). A similarity criterion may also be based on a different error value, such as one present for a given data matrix.

An example similarity measurement may be computed as distance between two points $X, Y \in Gr(k,n)$ in the form, although other similarity measurements may be employed:

$$d(X, Y) = \sqrt{\sum_i \theta_i^2}$$

Success of the classifier is derived from the property that the action of $M^{(i)}$ for points of unknown data sets near the training data for class i is similar to the action of the same $M^{(i)}$ for actual training data points. For example, a high quality classifier satisfies the property $$d(\tilde{X}, M^{(i)}(\tilde{X})) < \kappa_i \epsilon_M$$

where $d(X, \tilde{X}) < \delta$ and constant error threshold $\kappa_i \epsilon_M$ (a defined threshold) represents a measure of the quality of the identity mapping $M^{(i)}$.

For all $i \neq j$ and $\tilde{X} \in \omega_i$, then the following relationship ship is designed:

$$d(\tilde{X}, M^{(j)}(\tilde{X})) >> \kappa_i \epsilon_M$$

Accordingly, a data set Y of unlabeled patterns may be classified by solving the classification criterion:

$$i^* = \underset{i}{\mathrm{argmin}}\, d(Y, M^{(i)}(Y)) \quad (2)$$

Equation 2 essentially sweeps through all of the class mapping operators $M^{(i)}$ to identify the particular $M^{(i)}$ that behaves most like the identity for the point mapped from data set Y. In Equation 2, the classification criterion is a minimum similarity measurement across all of the classes, although other criteria may be applied. The data set Y is then assigned to the identified class $\omega_i$. In some implementations, this assignment is dependent upon the value of $d(X,M^{(i)}(X))$ not exceeding a similarity threshold.

Note: It is also reasonable to construct a collection of mappings $\{M_j^{(i)}\}_{j=1}^{K_i}$ of the identity for the data associated with each class i and to combine their contributions in a similar fashion. Each mapping for a class, while derived from the labeled array's data sets, can be defined over different domains and ranges.

Figure 5:
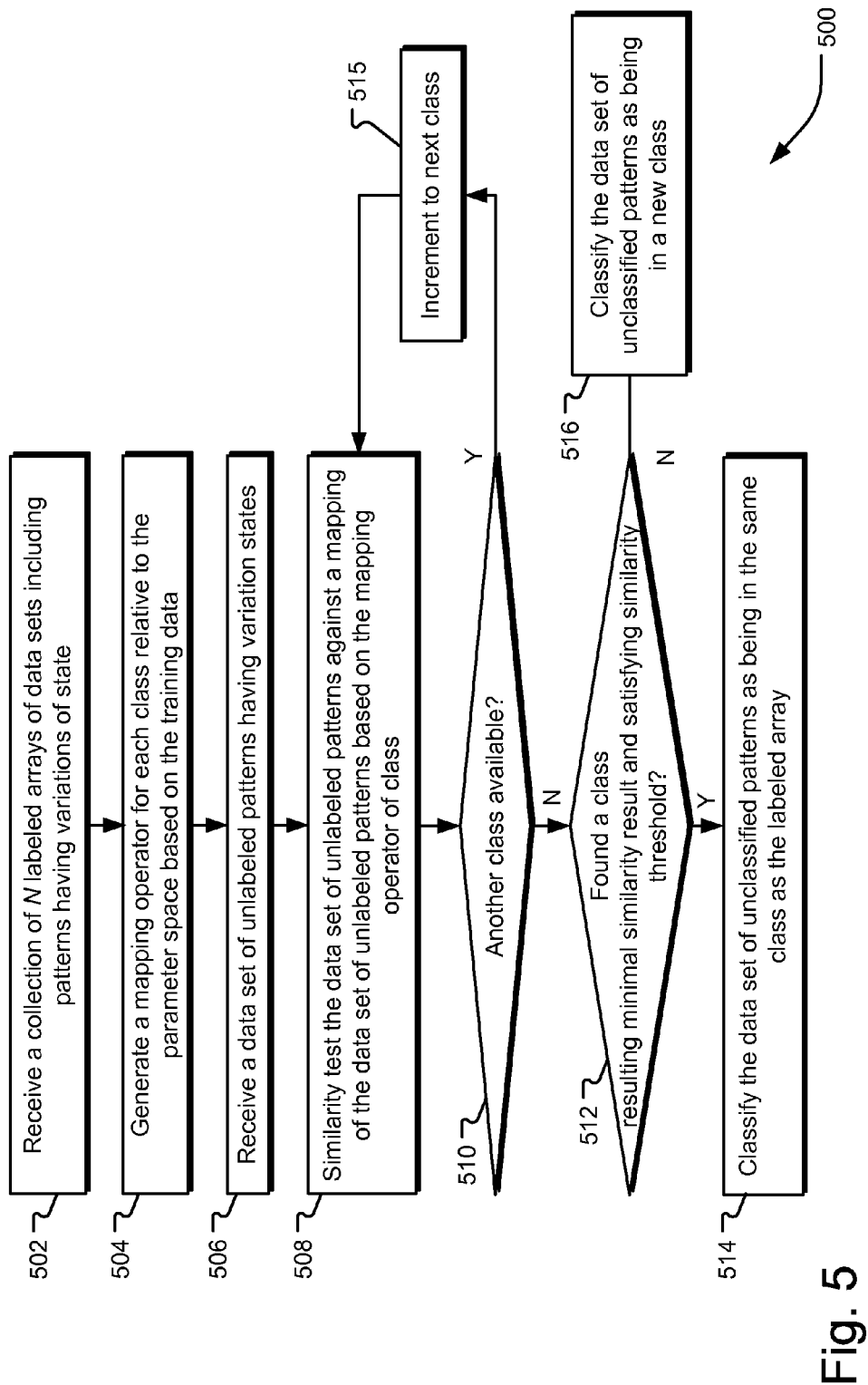
FIG. 5 illustrates example operations for performing set-to-set pattern recognition.

FIG. 5 illustrates example operations 500 for performing set-to-set pattern recognition. A receiving operation 502 receives a collection of N labeled arrays of data sets of patterns, each data set including related patterns (e.g., images of the same subject) having variations of state and each labeled array containing related data sets. The data sets of these labeled arrays are encoded on the parameter space (e.g., a nonlinear parameter space). A mapping operation 504 generates a mapping operator for each class that maps each training data set of corresponding labeled array to at least one point on a parameter space. In one implementation, a mapping operator $$M_i(X_i) = D_i \cdot (D_i^{T*} D_i)^{-1} D_i^{T*} (X_i)$$

is used to map the data sets $D_i = \{X_i^{(1)}, \ldots, X_i^{(P_i)}\}$ of a labeled array i on the parameter space. Each mapping of the data sets of a labeled array defines a subset of the parameter space.

Another receiving operation 506 receives a data set of related unlabeled patterns (e.g., images having the same subject), wherein the patterns exhibit variations of state (e.g., illumination, pose, attire, facial hair, hair style, etc.).

A similarity test operation 508 tests the data set of related unlabeled patterns against the mapping of the data set of related unlabeled patterns to the parameter space, using the mapping operator of a current class. A result of the similarity test operation 508 is a similarity measurement relating to the current class and the data set of related unlabeled patterns.

An iteration operation 510 determines whether any additional classes are available to be tested. If so, an incrementing operation 515 increments the processing loop to the next available class. If not, a selection operation 512 determines whether a class has been found that results in the minimum similarity measurement and satisfies a similarity threshold. If so, a classification operation 514 assigns the data set of related unlabeled patterns to the class of the mapping operator that satisfied the similarity criterion of selection operation 512. If not, the data set of related unlabeled patterns is deemed unclassifiable or is assigned to a new class. The data set may then be added to the training data under its newly identified classification.

Note: It should be understood that implementations may be made that omit the similarity threshold from the similarity criterion. Likewise, other similarity criterion may also be used to determine which mapping operator best maps the data set of the related unlabeled patterns to a labeled subset of the parameter space.

Figure 6:
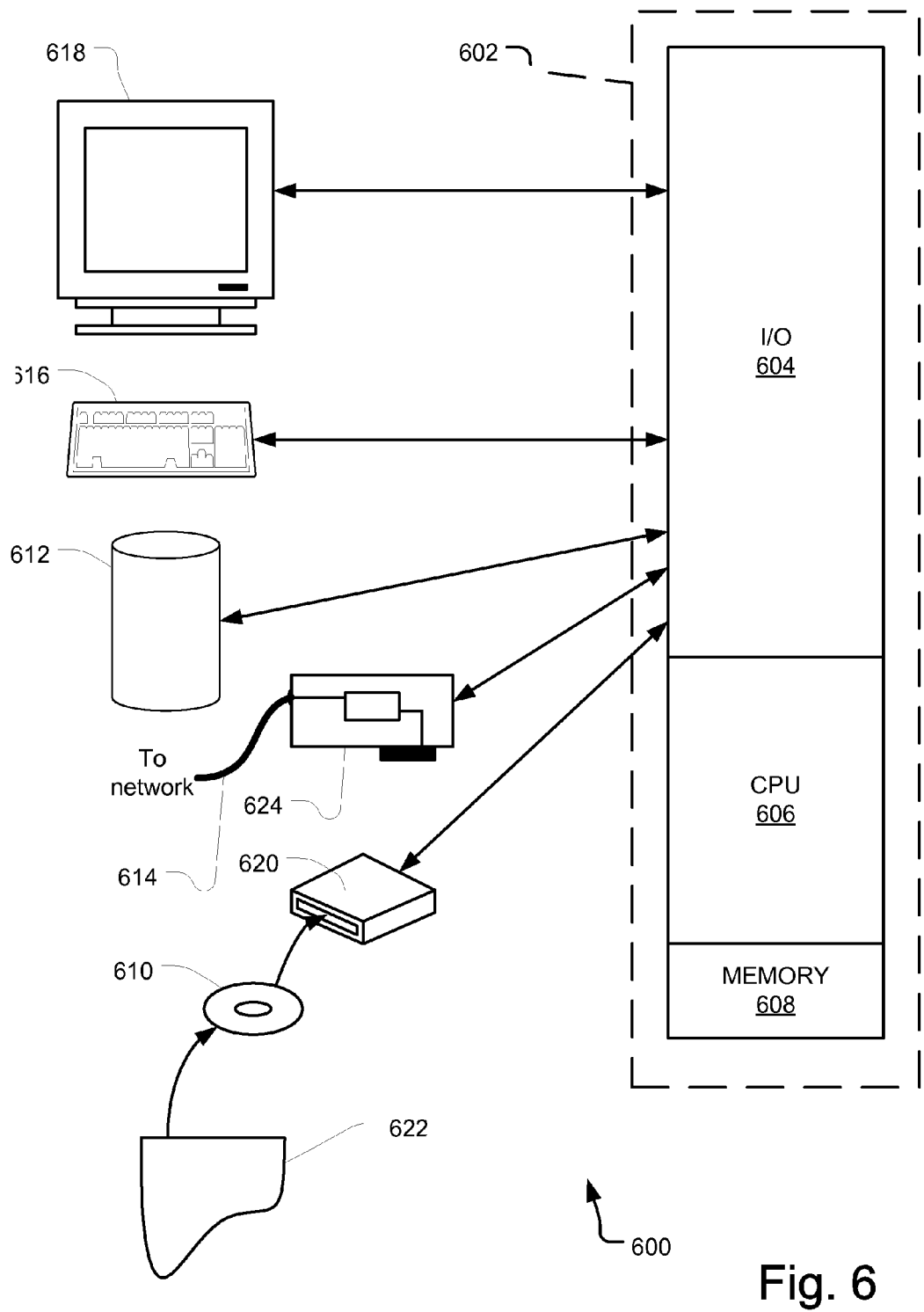
FIG. 6 illustrates components of an example system that can be useful in the implementation of the described technology.

FIG. 6 illustrates components of an example system that can be useful in the implementation of the described technology. A general purpose computer system 600 is capable of executing a computer program product to execute a computer process. Data and program files may be input to the computer system 600, which reads the files and executes the programs therein. Some of the elements of a general purpose computer system 600 are shown in FIG. 6 wherein a processor 602 is shown having an input/output (I/O) section 604, a Central Processing Unit (CPU) 606, and a memory section 608. There may be one or more processors 602, such that the processor 602 of the computer system 600 comprises a single central-processing unit 606, or a plurality of processing units, commonly referred to as a parallel processing environment. The computer system 600 may be a conventional computer, a distributed computer, or any other type of computer. The described technology is optionally implemented in software devices loaded in memory 608, stored on a configured DVD/CD-ROM 610 or storage unit 612, and/or communicated via a wired or wireless network link 614 on a carrier signal, thereby transforming the computer system 600 in FIG. 6 to a special purpose machine for implementing the described operations.

The I/O section 604 is connected to one or more user-interface devices (e.g., a keyboard 616 and a display unit 618), a disk storage unit 612, and a disk drive unit 620. Generally, in contemporary systems, the disk drive unit 620 is a DVD/CD-ROM drive unit capable of reading the DVD/CD-ROM medium 610, which typically contains programs and data 622. Computer program products containing mechanisms to effectuate the systems and methods in accordance with the described technology may reside in the memory section 604, on a disk storage unit 612, or on the DVD/CD-ROM medium 610 of such a system 600. Alternatively, a disk drive unit 620 may be replaced or supplemented by a floppy drive unit, a tape drive unit, or other storage medium drive unit. The network adapter 624 is capable of connecting the computer system to a network via the network link 614, through which the computer system can receive instructions and data embodied in a carrier wave. Examples of such systems include but are not limited to personal computers offered manufacturers of Intel-compatible computing systems, PowerPC-based computing systems, ARM-based computing systems, and other systems running a UNIX-based or other operating system. It should be understood that computing systems may also embody devices such as Personal Digital Assistants (PDAs), mobile phones, gaming consoles, set top boxes, etc.

When used in a LAN-networking environment, the computer system 600 is connected (by wired connection or wirelessly) to a local network through the network interface or adapter 624, which is one type of communications device. When used in a WAN-networking environment, the computer system 600 typically includes a modem, a network adapter, or any other type of communications device for establishing communications over the wide area network. In a networked environment, program modules depicted relative to the computer system 600 or portions thereof, may be stored in a remote memory storage device. It is appreciated that the network connections shown are exemplary and other means of and communications devices for establishing a communications link between the computers may be used.

In an example implementation, a pre-processor, a classifier module, and other modules may be embodied by instructions stored in memory 608 and/or storage devices 612 or storage media 610 and processed by the processing unit 606. Labeled arrays of data sets, unlabeled data sets, mapped data, and other data may be stored in memory 608 and/or storage devices 612 or storage media 610 as persistent datastores.

The technology described herein is implemented as logical operations and/or modules in one or more systems. The logical operations may be implemented as a sequence of processor-implemented steps executing in one or more computer systems and as interconnected machine or circuit modules within one or more computer systems. Likewise, the descriptions of various component modules may be provided in terms of operations executed or effected by the modules. The resulting implementation is a matter of choice, dependent on the performance requirements of the underlying system implementing the described technology. Accordingly, the logical operations making up the embodiments of the technology described herein are referred to variously as operations, steps, objects, or modules. Furthermore, it should be understood that logical operations may be performed in any order, unless explicitly claimed otherwise or a specific order is inherently necessitated by the claim language.

The above specification, examples and data provide a complete description of the structure and use of example embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention. In particular, it should be understood that the described technology may be employed independent of a personal computer. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the invention as defined in the following claims.

Although the subject matter has been described in language specific to structural features and/or methodological arts, it is to be understood that the subject matter defined in the appended claims is not necessarily limited to the specific features or acts descried above. Rather, the specific features and acts described above are disclosed as example forms of implementing the claimed subject matter.

What is claimed is:

1. A method of classifying a data set of related unlabeled patterns, the method comprising:
   encoding a collection of data sets of patterns onto a parameter space, each data set being encoded to at least one point on the parameter space, each data set further being allocated to a labeled array of data sets, each labeled array being designated to a class;
   defining a mapping operator for each class that maps the data sets of the labeled array onto the parameter space in satisfaction of a similarity criterion based on the encoded points of that labeled array on the parameter space;
   encoding the data set of related unlabeled patterns to at least one point on the parameter space;
   generating a similarity measurement for each class based on the encoded point of the data set of related unlabeled patterns by mapping the data set of related unlabeled patterns on the parameter space using the mapping operator for the class;
   labeling the data set of related unlabeled patterns as a member of a class, if the similarity measurement associated with the mapping operator of the class satisfies a classification criterion.

2. The method of claim 1 wherein a similarity measurement associated with the mapping operator of the class satisfies the classification criterion if the similarity measurement is the minimum of all similarity measurements associated with the mapping operators of the classes.

3. The method of claim 1 wherein the operation of encoding a collection of data sets and the operation of encoding the data set of related unlabeled patterns comprise mapping all of the data sets on the parameter space using the same encoding algorithm.

4. The method of claim 1 wherein the similarity criterion is satisfied if the data sets of the labeled array are mapped using the mapping operator of the labeled array to the same location, within a defined threshold, on the parameter space as the encoded points of that labeled array on the parameter space.

5. The method of claim 1 wherein a similarity measurement represents a difference between a point encoded on the parameter space from the data set of related unlabeled patterns and a point mapped from the data set of related unlabeled patterns by the mapping operator of the class.

6. The method of claim 1 wherein the labeling operation comprises:
   labeling the data set of related unlabeled patterns as a member of the class, if the similarity measurement associated with the mapping operator of the class satisfies the classification criterion and the similarity measurement satisfies a similarity threshold.

7. The method of claim 1 further comprising:
   indicating an unsuccessful classification, if no similarity measurement satisfies a similarity threshold.

8. One or more computer readable storage media storing computer executable instructions for executing a computer process classifying a data set of related unlabeled patterns on a computing system, the computer process comprising:
   encoding a collection of data sets of patterns onto a parameter space, each data set being encoded to at least one point on the parameter space, each data set further being allocated to a labeled array of data sets, each labeled array being designated to a class;
   defining a mapping operator for each class that maps the data sets of the labeled array onto the parameter space in satisfaction of a similarity criterion based on the encoded points of that labeled array on the parameter space;
   encoding the data set of related unlabeled patterns to at least one point on the parameter space;
   generating a similarity measurement for each class based on the encoded point of the data set of related unlabeled patterns by mapping the data set of related unlabeled patterns on the parameter space using the mapping operator for the class;
   labeling the data set of related unlabeled patterns as a member of a class, if the similarity measurement associated with the mapping operator of the labeled array satisfies a classification criterion.

9. The one or more computer readable media of claim 8 wherein a similarity measurement associated with the mapping operator of the class satisfies the classification criterion if the similarity measurement is the minimum of all similarity measurements associated with the mapping operators of the classes.

10. The one or more computer readable media of claim 8 wherein the operation of encoding a collection of data sets and the operation of encoding the data set of related unlabeled patterns comprise mapping all of the data sets on the parameter space using the same encoding algorithm.

11. The one or more computer readable media of claim 8 wherein the similarity criterion is satisfied if the data sets of the labeled array are mapped using the mapping operator of the labeled array to the same location, within a defined threshold, on the parameter space as the encoded points of that labeled array on the parameter space.

12. The one or more computer readable media of claim 8 wherein a similarity measurement represents a difference between a point encoded on the parameter space from the data set of related unlabeled patterns and a point mapped from the data set of related unlabeled patterns by the mapping operator of the class.

13. The one or more computer readable media of claim 8 wherein the labeling operation comprises:
  labeling the data set of related unlabeled patterns as a member of the class, if the similarity measurement associated with the mapping operator of the class satisfies the classification criterion and the similarity measurement satisfies a similarity threshold.

14. The one or more computer readable media of claim 8 wherein the computer process further comprises:
  indicating an unsuccessful classification, if no similarity measurement satisfies a similarity threshold.

15. A method of classifying a data set of related unlabeled patterns, the method comprising:
  encoding a collection of data sets of patterns to points on a nonlinear parameter space, wherein data sets allocated to a labeled array are grouped in a region of the nonlinear parameter space, each labeled array being designated to a class;
  defining a mapping operator for each class that maps the data sets of the labeled array onto the nonlinear parameter space in satisfaction of a similarity criterion based on the encoded points of that labeled array on the nonlinear parameter space;
  generating a similarity measurement for each class based on the data set of related unlabeled patterns by mapping the data set of related unlabeled patterns on the nonlinear parameter space using the mapping operator for the class;
  labeling the data set of related unlabeled patterns as a member of a class, if the similarity measurement associated with the mapping operator of the class satisfies a classification criterion.

16. The method of claim 15 wherein a similarity measurement associated with the mapping operator of the class satisfies the classification criterion if the similarity measurement is the minimum of all similarity measurements associated with the mapping operators of the classes.

17. The method of claim 15 wherein the operation of encoding a collection of data sets and the operation of encoding the data set of related unlabeled patterns comprise mapping all of the data sets on the nonlinear parameter space using the same encoding algorithm.

18. The method of claim 15 wherein the similarity criterion is satisfied if the data sets of the labeled array are mapped using the mapping operator of the labeled array to the same location, within a defined threshold, on the nonlinear parameter space as the encoded points of that labeled array on the nonlinear parameter space.

19. The method of claim 15 wherein a similarity measurement represents a difference between a point encoded on the nonlinear parameter space from the data set of related unlabeled patterns and a point mapped from the data set of related unlabeled patterns by the mapping operator of the class.

20. The method of claim 15 wherein the labeling operation comprises:
  labeling the data set of related unlabeled patterns as a member of a class, if the similarity measurement associated with the mapping operator of the class satisfies the classification criterion and the similarity measurement satisfies a similarity threshold.

* * * * *